S. B. HASELTINE.
FRICTION GEAR.
APPLICATION FILED APR. 5, 1915.
1,203,196.
Patented Oct. 31, 1916.
2 SHEETS—SHEET 1.
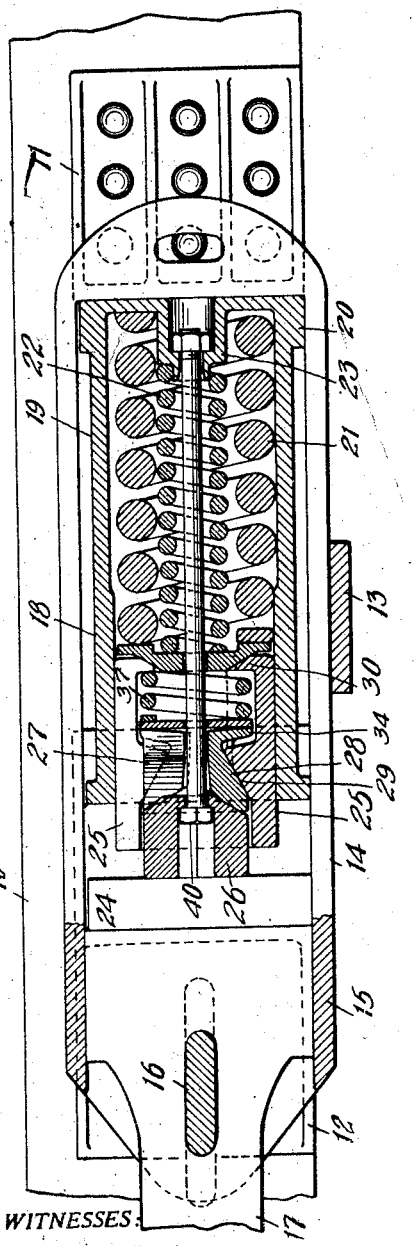
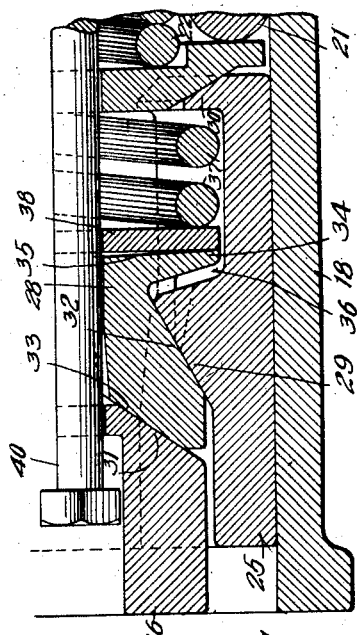
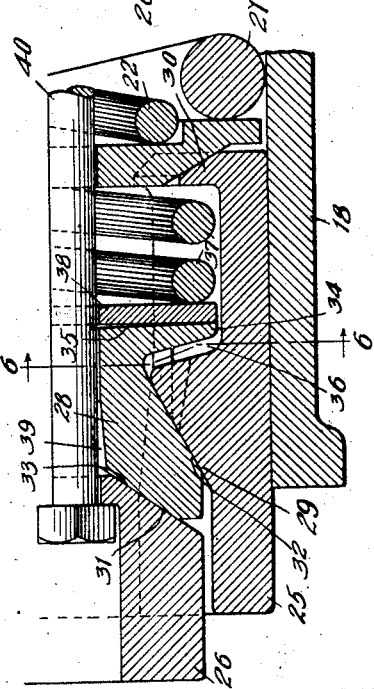
INVENTOR.
Stacy B. Haseltine
BY George I. Haight
his ATTORNEY
WITNESSES:

S. B. HASELTINE.
FRICTION GEAR.
APPLICATION FILED APR. 5, 1915.
1,203,196.
Patented Oct. 31, 1916.
2 SHEETS—SHEET 2.
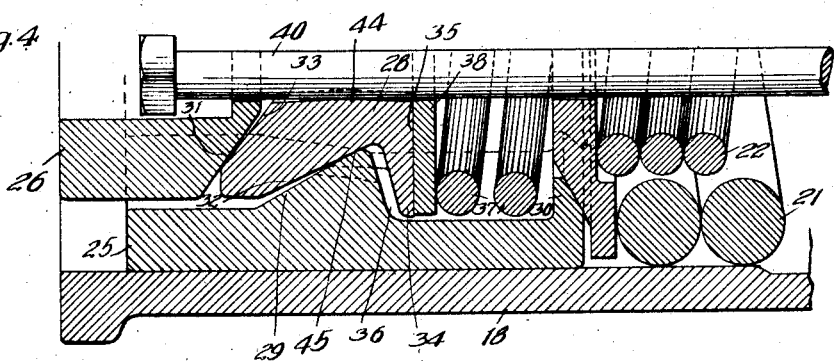
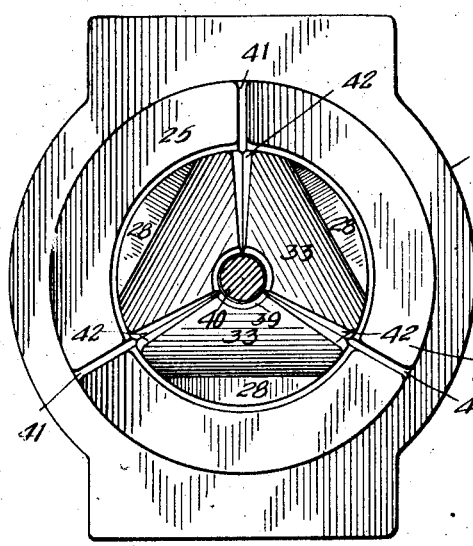
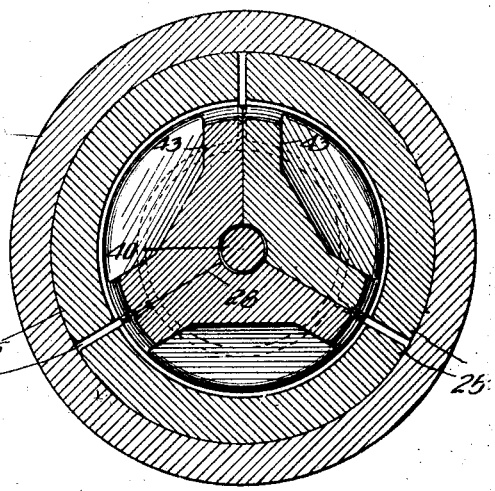
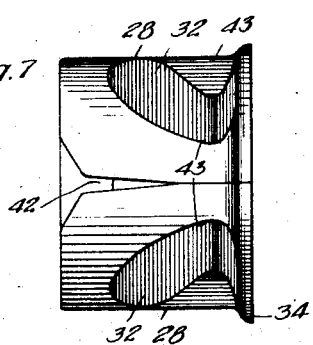
WITNESSES:
INVENTOR.
Stacy B. Haseltine
BY George J. Haight
his ATTORNEY

UNITED STATES PATENT OFFICE.

STACY B. HASELTINE, OF CHICAGO, ILLINOIS, ASSIGNOR TO WILLIAM H. MINER, OF CHAZY, NEW YORK.

FRICTION-GEAR.

1,203,196.

Specification of Letters Patent.

Patented Oct. 31, 1916.

Application filed April 5, 1915. Serial No. 19,351.

*To all whom it may concern:*

Be it known that I, STACY B. HASELTINE, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

An object of the invention is to provide a friction gear for draft riggings of high capacity, strong construction, simple in arrangement, efficient in operation, and having the friction elements so arranged as to permit of certain release and avoidance of all danger of sticking.

The invention furthermore consists in the improvements of the parts and devices and in the novel combinations of the parts and devices, as herein shown, described or claimed.

In the drawing forming a part of this specification, Figure 1 is a vertical sectional view of a friction draft rigging showing my improvements in connection therewith. Fig. 2 is an enlarged detail sectional view of a portion of the front end of the friction gear proper and illustrating the arrangement of friction devices employed, the parts being in full release. Fig. 3 is a view similar to Fig. 2 but showing the parts in full buff and as the parts appear with the pressure still applied to the gear. Fig. 4 is a view similar to Fig. 3 but showing the actuation of some of the wedging members as the same occurs immediately upon release of the pressure against the blunt wedge block. Fig. 5 is a front end elevation of the friction gear, with the blunt wedge removed and the connecting bolt in section, and Fig. 6 is a transverse sectional view taken substantially on the line 6—6 of Fig. 2. Fig. 7 is a side elevation of the collapsible wedge.

In said drawing 10 denotes one of the center sills to which is secured a rear stop 11, front stop 12 and saddle or carrying plate
13. The latter supports the cast yoke 14 having a hooded forward end 15 keyed as by a coupler key 16 to a draw-bar 17. The foregoing parts are or may be of any well known or desirable construction.

Mounted within the yoke is my improved gear which, as shown, comprises a friction shell 18 having an integral spring case 19 and rear follower 20. Confined within the spring case 19 is the main spring which, as shown, comprises an outer coil 21 and an inner lighter coil 22, said coils bearing at their rear ends respectively against the rear follower 20 and inwardly extended boss 23. At their forward ends, the springs 21 and 22 bear against a spring follower plate 24.

Mounted within the friction shell 18 is my improved arrangement of friction elements which, as here shown, comprise a plurality of circularly arranged friction shoes 25 and a compound spreader consisting of an outer blunt wedge 26 and a collapsible acute wedge 27, the latter consisting of a plurality of wedge blocks 28—28. Each friction shoe 25 is provided on its outer face with a friction surface to coöperate with the inner friction surface of the shell in the usual manner, and on its inner face, each shoe 25 is provided with an inclined wedging face 29 and an inwardly extended rib or shoulder 30 at its inner end. The blunt wedge 26 is provided at its inner end with a series of wedge faces 31 forming a blunt wedge, that is, with the faces 31 forming a relatively large or blunt angle with the axis of the gear. Each of the wedging blocks 28 forming the acute wedge of the spreader, is provided on its outer face with a wedging face 32 engageable with the wedging face 29 of its corresponding friction shoe, and a blunt wedge face 33 at its outer end coöperable with its corresponding blunt wedge face 31 of the wedge block 26. At its inner end, each wedge block 28 is provided with a laterally extended flange or foot 34, beveled as indicated at 35 on its inner end, and normally spaced as indicated at 36 from the inner end of the wedging shoulder formed on the friction shoe.

Interposed between the wedging blocks 28 and the inturned shoulders 30 on the friction shoes is a supplemental or auxiliary spring 37 which, at its outer end, engages a spring follower plate 38, the latter in turn engaging the outer edges of said beveled flanges or feet 34. The spring 37 is placed under an initial compression corresponding to the space 36.

On their inner or substantially axial faces, the blocks 28 are provided with cut-away or beveled faces 39 near their outer ends, thus providing a clearance between said blocks and the connecting bolt 40 (see Figs. 2 and 3). As also clearly appears from Figs. 5 and 6, clearances indicated at 41 and 42 are provided between the longitudinally extending lateral edges of the friction shoes and blocks 28, the clearance 42 being provided for a purpose hereinafter specified. In preferable construction, as shown in Fig. 6, the blocks 28, on their outer faces, are contoured as indicated at 43 to fit the friction shoes and prevent relative radial displacement of the blocks and shoes.

The operation is as follows: Upon inward movement of the draw-bar under buff, the blunt wedge coacts with the acute wdege formed by the blocks 28 to spread the friction shoes outwardly against the friction shell, all of the wedge blocks acting as a single unit. The full buff position of the parts is shown in Fig. 3. Now, upon release of the pressure against the blunt wedge 26, the blunt wedging faces 31 and 33 are readily separated, as will be understood, whereupon the spring 37 which acts through the plate 38 will tilt the blocks 28 of the acute wedge by pressing said blocks out from their outer ends. In this way, the blocks 28 pivot about a point indicated approximately at 44 (see Fig. 4) and also about a point indicated approximately at 45. This causes the acute wedge formed of the blocks 28 to collapse which immediately releases the outward pressure from the wedge or spreader against the friction shoes whereupon the main spring acting through the follower plate 24 will push the shoes outwardly to full release position. When the parts are in their outermost or full released position, it is apparent that a pressure will be exerted through the blunt wedge 26 against the acute inner wedge sufficient to expand the then collapsed acute wedge until the parts assume the position shown in Figs. 1, 2 and 3. As will be understood, the clearances 42 permit of the collapsing of the acute wedge member of the spreader.

From the preceding description it will be seen that I have provided a gear of high capacity and one in which the release is certain. Also, during the release it is obvious that the collapse of the acute wedge member occurs by a pivotal movement of the blocks forming said member rather than a longitudinal outward movement of said blocks forming the acute wedge. In other words, it is not necessary for the engaging wedge faces 29 and 32 to shift longitudinally relatively to each other before the release can occur. The blocks 28 merely swing or pivot about the friction shoes whereby the friction faces 32 recede from the friction faces 29. It is this movement and action which insures the immediate and effective release of the parts.

As clearly seen from an inspection of Fig. 7, the clearances 42—42 will permit the members of the collapsible wedge to approach each other at their outer ends during the releasing operation of the gear.

Although I have herein shown and described what I consider the preferred embodiment of my improvements, yet I am aware that various changes and modifications may be made in the details of construction and arrangement of parts, without departing from the spirit of the invention and all such changes and modifications are contemplated as come within the scope of the claims appended hereto.

I claim:—

1. A friction gear for draft riggings comprising, in combination, a friction shell, shoes, a compound spreader, said spreader comprising a blunt wedge and an acute collapsible wedge, the acute wedge consisting of a plurality of wedge blocks acting directly against the friction shoes, and a spring acting against said blocks to tilt the same on release.

2. A friction gear for draft riggings comprising, in combination, friction shell, friction shoes, a compound spreader including a blunt wedge and an acute collapsible wedge, and a spring acting directly against said collapsible wedge to collapse it on release.

3. A friction gear for draft riggings comprising, in combination, friction shell, friction shoes, a compound spreader including a blunt wedge and an acute collapsible wedge, and a spring acting directly against said collapsible wedge to collapse it on release, said spring being interposed between the inner ends of the members forming the collapsible wedge and shoulders formed on the inner ends of the friction shoes.

4. A friction gear for draft riggings comprising a shell, friction shoes, and a compound spreader, said spreader including a blunt wedge and a collapsible acute wedge, said acute wedge consisting of a plurality of wedge blocks having their inner longitudinal faces beveled to permit same to collapse by pivotal movement thereof.

5. A friction gear for draft riggings comprising a friction shell, friction shoes, a compound spreader consisting of a blunt wedge and an acute wedge composed of a plurality of wedge blocks, each of said wedge blocks being beveled on its innermost end, and a spring acting against said blocks on the outer edges of said beveled ends.

6. A friction gear for draft riggings comprising a friction shell, friction shoes, a compound spreader, said spreader including a blunt wedge and a collapsible acute wedge, the latter consisting of a plurality of wedge blocks having their inner ends beveled, a follower plate engaging the outer edges of said beveled inner ends of the wedge blocks in normal position of the parts, and a spring engaging said plate, the spring through said plate tilting said wedge blocks to collapse the acute wedge upon release.

7. A friction gear for draft riggings comprising, in combination, a friction shell, friction shoes, a compound spreader, said spreader including a blunt wedge and a collapsible acute wedge consisting of a plurality of wedge blocks, the wedge blocks corresponding in number to the number of friction shoes, each block engaging one friction shoe only, and a spring acting against said wedge blocks to tilt the same on release.

8. A friction gear for draft riggings comprising a friction shell, friction shoes, a compound spreader, the latter consisting of a blunt wedge and an acute collapsible wedge, the collapsible wedge consisting of a plurality of wedge blocks having beveled inner longitudinal faces, and a spring acting against said wedge blocks to tilt the same and collapse the acute wedge upon release.

9. A friction gear for draft riggings comprising, a friction shell, friction shoes, the latter having inner wedge faces and shoulders at their inner ends, a main spring acting against said shoes, a compound spreader comprising an outer blunt wedge and an inner acute collapsible wedge, the elements of which are arranged to pivot about the wedge shoulders of said shoes, and a spring interposed between the inner end of the acute wedge and said shoulders on the inner ends of the friction shoes.

In witness that I claim the foregoing I have hereunto subscribed my name this 24th day of March, 1915.

STACY B. HASELTINE.

Witnesses:
CARRIE G. RANZ,
GEORGIE VICKERY.